United States Patent

[11] 3,542,394

| [72] | Inventor | Carl Palage<br>8 Maple Road, Winchester, Massachusetts 01890 |
|---|---|---|
| [21] | Appl. No. | 798,899 |
| [22] | Filed | Feb. 13, 1969 |
| [45] | Patented | Nov. 24, 1970 |

[54] STABILIZING MEANS FOR A TRAILER
6 Claims, 5 Drawing Figs.

[52] U.S. Cl. .................................................. 280/406, 280/446
[51] Int. Cl. ................................................... B60d 1/06
[50] Field of Search .......................................... 280/406, 406(.1), 446.3

[56] References Cited
UNITED STATES PATENTS

| 2,817,541 | 12/1957 | Mathisen .................... | 280/406 |
| 2,952,475 | 9/1960 | Reese ........................ | 280/406 |
| 3,194,584 | 7/1965 | Reese ........................ | 280/406 |
| 3,206,224 | 9/1965 | Bock et al. .................. | 280/406 |
| 3,434,735 | 3/1969 | Bernard ...................... | 280/406 |
| 3,441,291 | 4/1969 | Morris ....................... | 280/406 |

*Primary Examiner*—Leo Friaglia
*Attorney*—Chittick, Pfund, Birch, Samuels & Gauthier ABSTRACT: Means for connecting the rear end of the spring bar of a tractor trailer hitch with the trailer frame so that when the tractor turns to the right or left with respect to the trailer to cause longitudinal movement of the spring bars relative to the trailer frame, such movement will be permitted but strongly resisted by the connecting means. This causes better tracking of the trailer behind the tractor. The connecting means also acts through the spring bar to resist any back and forth rolling tendency of the trailer relative to the tractor.

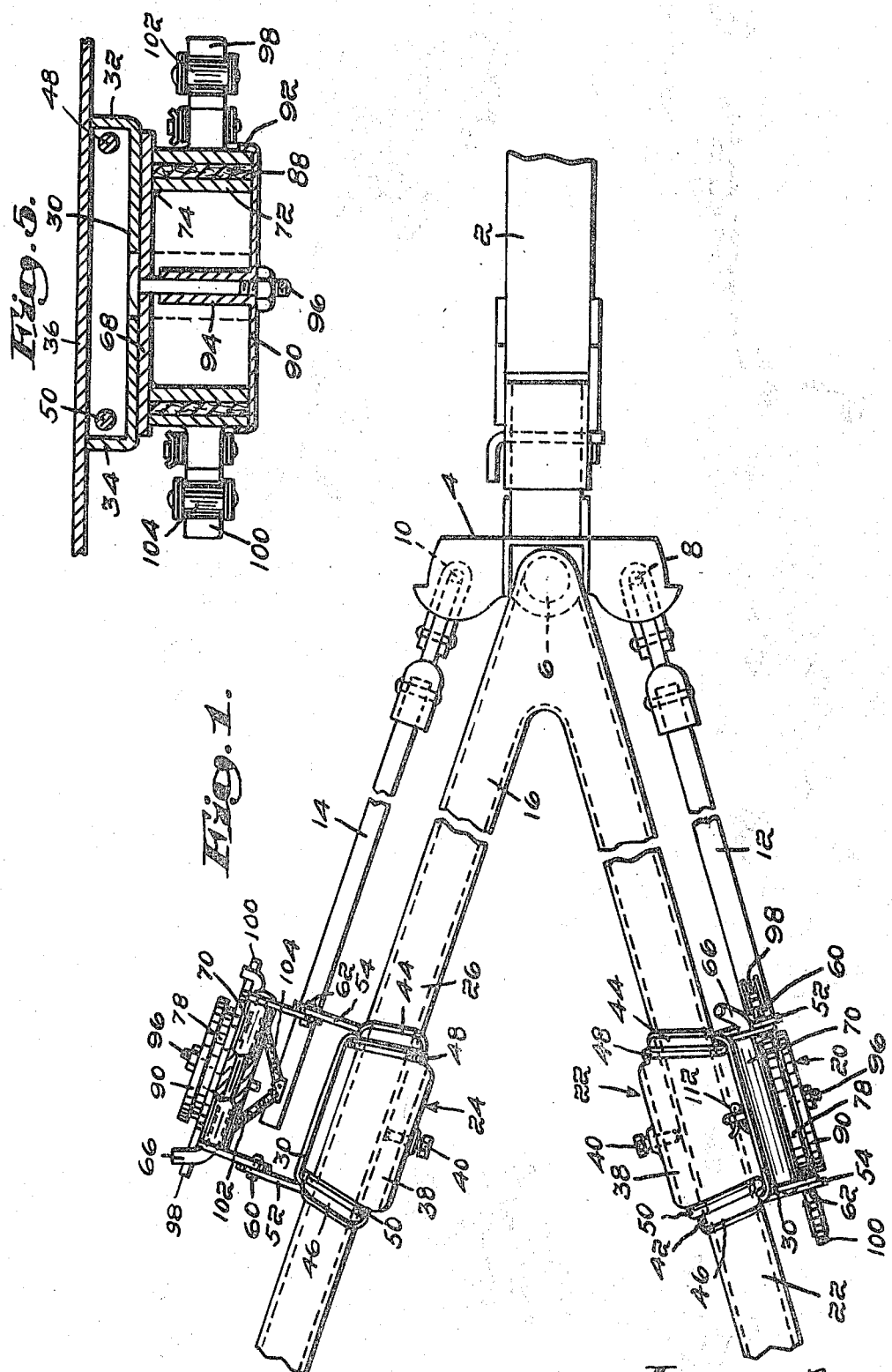

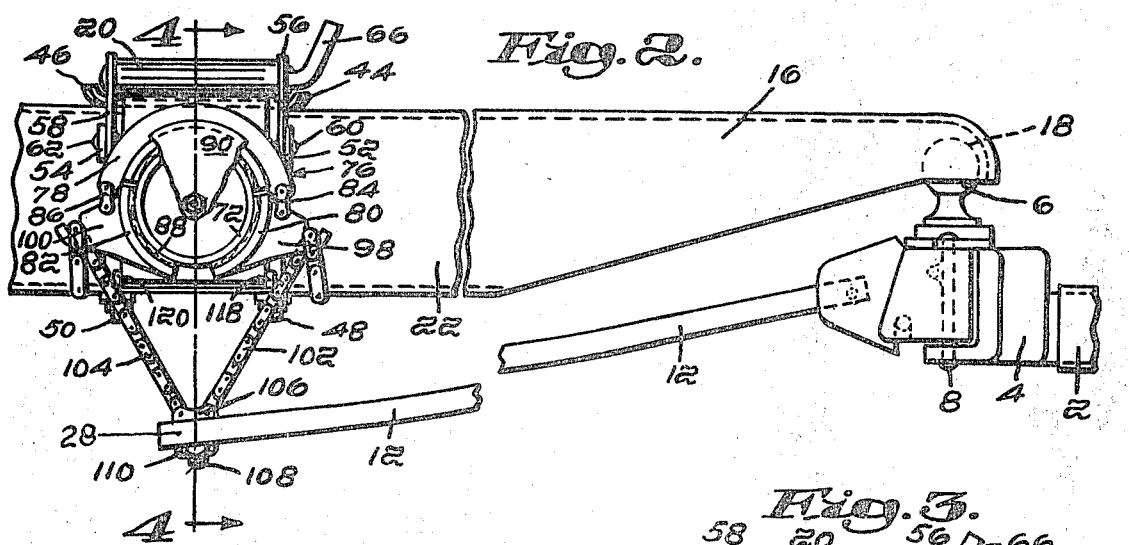
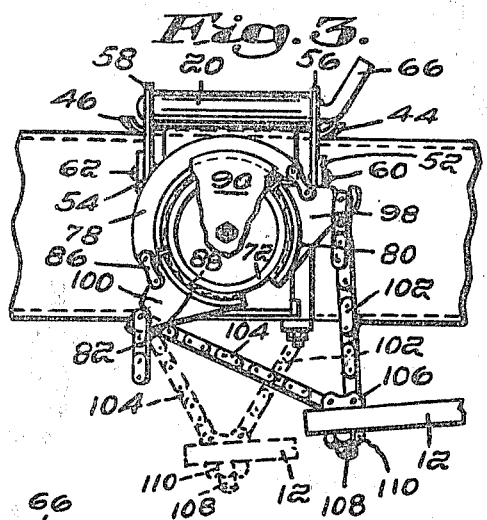
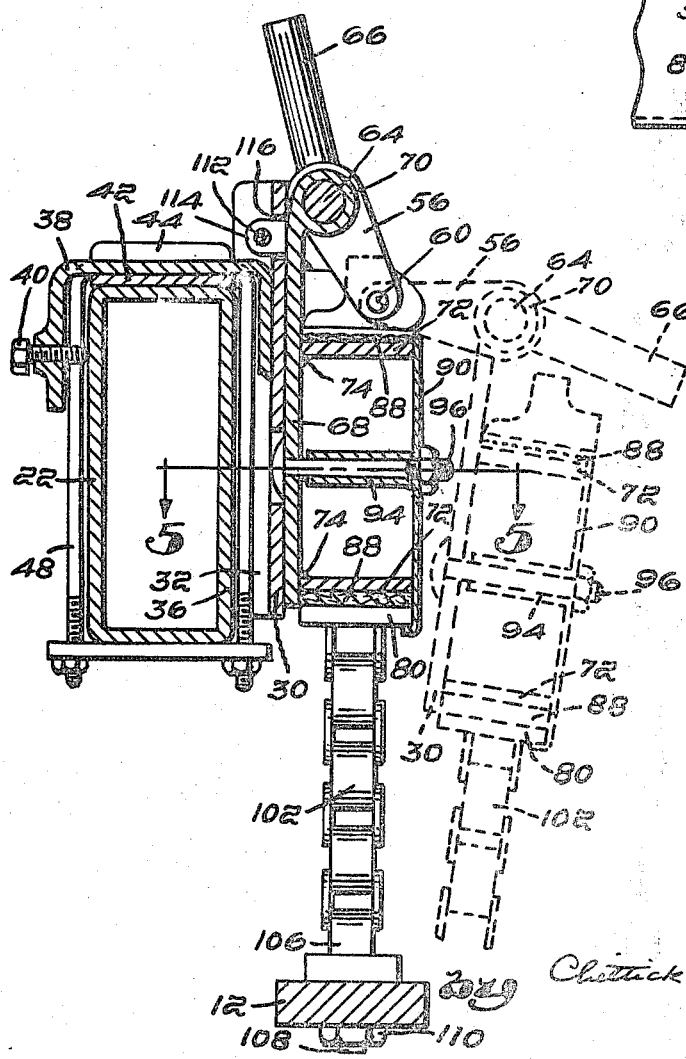

STABILIZING MEANS FOR A TRAILER

BACKGROUND OF THE INVENTION

This invention is related to that type of trailer hitch now commonly in use in which a passenger automobile, for example, is used to pull a trailer of the type that has its center of gravity forward of the wheels. The hitch is of the load stabilizing type, the mechanics of which are now well understood in the trade. Details of this type of hitch construction may be found in the U.S. Pat. to Mathesen, No. 2,817,541; Livermont, No. 2,924,463; Reese, No. 2,952,475; Bock, No. 3,151,879; Reese, No. 3,185,499; Reese, No. 3,194,584; Bock et al. No. 3,206,224; Payne, No. 3,248,127; and Worley, No. 3,284,098.

It will be noted in the U.S. Pats. to Worley, Bock et al. and Reese No. 3,194,584, that means is provided for resisting turning the trailer with respect to the tractor. Worley used hydraulic units 40, 40; Bock et al. use a nonadjustable troughlike structure supporting the ends of the spring bars in movable relation; Reese, U.S. Pat. No. 3,194,584 uses a cam-like mechanism functioning much in the manner of Bock et al. These mechanisms have been found desirable because they improve behavior of the trailer. Fishtailing is minimized; tracking is improved; swaying and rolling are minimized. These advantages are obtained without losing the benefits of the load equalizing means which is provided by the conventional spring bars.

SUMMARY

The device herein disclosed and claimed is a new and improved mechanism for connecting the rear ends of the spring bars to the trailer frame whereby all of the advantages of the prior art devices are obtained plus the additional features of quietness in operation, easy adjustability to obtain the correct degree of resistance to longitudinal movement of the spring bars, uniformity of operation after initial adjustment, and simplicity of installation.

The invention comprises, broadly, a brake drum mounted with its axis generally horizontal on the side of the trailer frame at a location above the rear end portion of the spring bar. An articulated brake shoe surrounds the drum for most of its circumference in conventional manner. The shoe is preferably made in three segments, which are hinged together or otherwise movably related to each other.

The top segment extends for about 140° and the two bottom segments extend for about 90° each. This leaves a gap of about 40° between the lower segments permitting them to be moved toward each other. These FIGS. are not critical and may be varied at will without materially affecting the principle of operation.

The three brakeshoe segments, preferably made of steel castings, are lined with conventional brake lining material shaped to fit the brakedrum. The two opposed lower segments have oppositely extending generally horizontal brake arms to each of which a downward force may be applied thus to bring the brakeshoe into tight frictional engagement with the drum.

The brake arms are connected to the spring bar by two tension members which might be rigid bars but preferably are flexible members such as short steel cables or chains. The tension members may be connected to the spring bar at spaced positions but it is preferred to have them connected at a common location which will be approximately below the axis of the brakedrum.

When the installation has been completed, the tension members will be under substantial tension load provided by the upwardly flexed spring bar to which they are affixed at their lower ends.

Thereafter, when the vehicles are in use and a turn to the left, for example, is made by the automobile, the right side spring bar moves forwardly but such movement is resisted by the frictional engagement of the brake band with the fixed brakedrum. The frictional engagement may be more or less according to the load applied to the brake arms by the adjustment of the tension members pulled downwardly by the upwardly flexed spring bar. The more the spring bar moves forward from neutral position, the more the movement is resisted by the braking action. This increased braking action is automatically achieved by the greater load placed on the tension members by the increasing upward bending of the spring bar. Such action must occur as the point of connection of the spring bar with the tension members follows a circular path about the brakedrum axis. Thus the farther forward (or rearward) the spring bar moves from neutral position, the more the end will be raised and the tighter the brake will be applied.

It is not contemplated that the brake setting at neutral position of the spring bar should prevent any rotation of the brake shoe. On the contrary, rotation must be permitted to accommodate movement of the spring bar which is directly related to the constantly changing angularity between the automobile and trailer.

During operation, the only movement of the various parts is of a noiseless character. The brakeshoe turns through a small angle as the automobile moves out of alignment with the trailer. The spring bar is silently flexed. No lubrication is required.

To facilitate initial connection of the brake arms with the end of the spring bar by the tension members, means is provided for lowering the brake unit from its normal location on the trailer frame to a position close enough to the spring bar for the tension members to be connected while in slack condition. Then, the brake unit is returned to operative position on the frame by manually actuated means capable of applying the necessary upward loading to the spring bar.

In the typical installation, there is preferably a brake unit for each of the two spring bars. However, experience has shown that in some instances, such as in the case of a relatively lightweight trailer, a single brake unit will give satisfactory results. Accordingly, while the detailed description of the invention hereinafter will be directed to one brake unit and the related spring bar, it is to be understood that the explanation contemplates the use of a brake unit on each spring bar if desired.

It should also be mentioned that any rolling of the trailer with respect to the automobile is also resisted by the increased upward bending that is applied to the spring bar by the tension members connected to the brake unit on the lifting side of the trailer. This antirolling capability is the same as that achieved by other mechanisms found in the prior art.

BRIEF DESCRIPTION OF THE DRAWINGS

FIG. 1 is a plan view of a trailer hitch showing the right-hand spring bar and brake unit in normal operating position. The left-hand brake unit is shown in lowered position to facilitate connection with the spring bar.

FIG. 2 is a side elevation of the right-hand spring bar and brake unit in normal position.

FIG. 3 is a view similar to FIG. 2 showing the change in position of the spring bar and brakeshoe when the automobile has turned to the left with respect to the trailer.

FIG. 4 is an enlarged vertical section taken on the line 4—4 of FIG. 2.

FIG. 5 is a horizontal section taken on the line 5—5 of FIG. 4.

DESCRIPTION OF THE PREFERRED EMBODIMENT

In the drawings, FIGS. 1 and 2 show plan and side elevational views of one type of trailer hitch now in use. The tow bar 2 and the related structure 4 which supports the ball 6 and the strong pivotal mountings 8 and 10 for the spring bars 12 and 14 are all in fixed relation to the automobile frame (not shown).

The spring bars 12 and 14 are mounted in the structure 4 in such manner that they may swing horizontally about pivots 8 and 10 but they cannot move vertically except as the free ends may be flexed by an overriding force. This is a common characteristic of spring bars now known to the art and the particular details of the mounting structure are immaterial to this disclosure The forward end of the trailer A-frame 16 has an inverted cooperating socket 18 which engages ball 6 to provide the flexible towing connection between the automobile and trailer. The spring bars 12 and 14 are usually made of spring steel and their length in relation to cross section provides a flexing capability under substantial load.

A brake unit 20 is mounted on the side 22 of A-frame 16 and, preferably, a similar brake unit 24 is mounted on the other side 26. A description of brake unit 20 and its relation to spring bar 12 will suffice for an understanding of brake unit 24 and spring bar 14.

As can be seen in FIG. 2, the brake unit 20 is mounted on frame side 22 over the rear end 28 of spring bar 12. The unit comprises a vertical back plate 30 having vertical flanges 32 and 34 which rest against the vertical wall 36 of side 22 which preferably may be of box shape as shown in FIG. 4.

An inverted U-shaped support 38 is welded to back plate 30 enabling the back plate to be clamped in fixed position on side 22 by the clamping screw 40. A longitudinally extending intermediate supporting plate 42 is welded to the underside of support 38. This plate has at its ends upturned ears 44 and 50 46 which serve to receive and locate a pair of U-bolts 48 and 50 which act as additional means for positive securing of back plate 30 against wall 36 of the A-frame side 22.

The operative brake structure is mounted on back plate 30 in such a manner that when it is in normal operation it is in fixed relation thereto, but when necessary it may be lowered to a position closer to spring bar 12 to permit initial connection of the tension members of subsequent adjustment.

Referring to FIGS. 2, 4 and 5, the brake and supporting structure will now be explained. A pair of ears 52 and 54 extend outward at right angles to back plate 30. Links 56 and 58 are pivoted thereto at 60 and 62. The links are connected by a round rod 64 with an extension at one end forming an actuating handle 66. Links 56 and 58 and rod 64 are welded together and swing as a unit about pivots 60 and 62.

A brakedrum support plate 68 depends from a tube 70 rotatably mounted on rod 64. On the face of plate 68 is brakedrum 72 welded thereto about its inner circumference as at 74. Surrounding the brakedrum is a brakeshoe 76 comprising three segments; an upper segment 78, a forward lower segment 80 and a rear lower segment 82. The segments may vary in their angular extent but in one form which has been found to work well the upper segment 78 may extend for about 140° about the brakedrum. The other two segments 80 and 82 which are pivoted to segment 78 at 84 and 86, respectively, extend for about 90°. Each segment is lined with brake lining 88 which conforms to the curvature of the brakedrum.

A cover plate 90 with an inturned flange 92 protects the braking surface from water and dirt. The cover plate is mounted against the outer end of a center tubular support 94 by bolt and nut 96. Cover plate 90 also serves to hold the inner edges of segments 78, 80 and 82 snug against support plate 68 to minimize the entrance of water and dirt at these places.

Segment 80 has a brake arm 98 extending forwardly therefrom and similarly segment 82 has a brake arm 100 extending rearwardly therefrom. The brake arms 98 and 100 have hooklike ends to facilitate engagement with the two flexible tension members 102 and 104 which preferably are in the form of chains of the type used with sprockets. The chains may be readily connected to the ends of the brake arms at any selected chain link. The other ends of the chains are secured to a terminal 106 having a threaded extension 108 passing through a hole in the end of spring arm 12 and secured by a nut 110.

When the brake unit 20 is in operative position as shown in FIGS. 1 and 2, the chains 102 and 104 will be in substantial tension sufficient to cause upward bending of spring bar 12. The downward force on brake arms 98 and 100 causes a tight clamping of the brake shoes on the brakedrum 72. When the automobile turns to the left, for example, the pivots 8 and 10 (see FIG. 1) move counterclockwise with respect to the socket 18 at the end of the A-frame 16. This causes spring bar 12 to move forward with respect to side 22 and spring bar 14 to move rearwardly with respect to side 26. The new position assumed by spring bar 12 and the brakeshoe 76 and connecting chains 102 and 104 is suggested in FIG. 3. The terminal 106 has moved in a circular path about the center of the brakedrum raising the end of spring bar 12 to increase the upward bend therein. The combined forces exerted by the chains 102 and 104 on the brake arms 98 and 100 cause the segments 80 and 82 to clamp the brakedrum tightly enough to offer substantial resistance to the forward movement of spring bar 12. This resistance helps to hold the wheels of the trailer in a steady path following the wheels of the automobile in a manner well understood.

The resistance characteristic may be controlled by the force applied by the spring bar 12 at neutral position related to the changing force as the bar 12 moves forward. The radius from the drum center to terminal 106 will determine the rate of rise of the end of spring bar 12. To apply more initial tension, the chains may be shortened link by link. Likewise, the effective length of brake arms 98 and 100 may be varied.

To facilitate initial connection of the chains to the hooks on the ends of brake arms 98 and 100 or to change the effective lengths of the chains, provision is made for lowering the entire brake unit an adequate distance to place the chains in slack condition.

As shown in FIG. 4, the supporting plate 68 is first unlocked from plate 30 by removal of pin 112 from the ear 114 extending from plate 68 through hole 116 in plate 30. Lever 66 and links 56 and 58 are then swung clockwise about pivots 60 and 62 raising the brake unit slightly until it passes over dead center after which it swings down to the dotted line position or farther if necessary as shown in FIG. 4. At this position, the chains 102 and 104 will have gone slack so that the chain links may be changed as desired with respect to the brake arms 98 and 100. Likewise, with the brake unit in down position, the chains, previously attached to terminal 106, may be placed in initial connection with brake arms 98 and 100. With the original or new chain settings established, the lever 66 is then returned to the up position shown in FIG. 4 and plate 68 is locked to plate 30 by insertion of pin 112 in ear 114. The chains 102 and 104 will be under the new tension and bar 12 will be suitably flexed to create the desired braking effect. Resumption of operation may then take place.

The brake unit 24 shown at the left in FIG. 1 is in down position corresponding to the down dotted line position in FIG. 4. When unit 24 is swung up to operative position, it will have the same controlling effect on spring bar 14 that unit 20 had on spring bar 12, even though the bars move in opposite directions when the automobile initiates a turn. Obviously, the resistance of the brake units 20 and 24 to the turning of the automobile with respect to the trailer is cumulative and in general two units give a better result than one unit. However, as pointed out previously, a single unit with a light trailer will be adequate in many cases.

To insure against any forward or rearward movement of plate 68 with respect to plate 30, small stops 118 and 120 may extend outwardly from plate 30 to engage the lower edges of plate 68 (see FIG. 2).

It will also be appreciated that when the trailer commences to roll due to road irregularity, wind or otherwise, so that the right side 22, for example, of A-frame 16 lifts, the chains 102 and 104 will at the same time lift the end of spring bar 12. The increased flexing of bar 12 will apply an increasing downward force against side 22 thus to reduce the extent of the roll to the left of the trailer. Similarly, when the trailer in turn rolls to the right, the spring bar 14 will resist such movement. Thus, the attachment of the brake units to the spring bars acts to dampen rolling motion in the same manner as the prior art devices. This behavior is mentioned only to show that the stabilizing ability of the present construction does not have any adverse effects with regards to roll damping capability.

I claim:

1. For use with a load-transferring trailer hitch which includes a spring bar mounted on the tractor in a manner permitting horizontal swinging movement only, means for connecting the free end of said spring bar to the trailer frame in a manner to resist longitudinal movement of said spring bar with respect to said trailer frame, said means comprising a brakedrum mounted on said frame and fixed against rotation, a contractable brakeshoe mounted on and surrounding a majority of the periphery of said brakedrum, a first brake arm fixed to said brakeshoe near one end thereof and extending toward said tractor, a second brake arm fixed to said brakeshoe near the other end thereof and extending away from said tractor, tension means connecting each of said brake arms to said spring bar at a position which is normally beneath said brakedrum, the said tension means normally holding the free end of said spring bar in a raised flexed position and applying a a braking force of said brakeshoe against said brakedrum whereby longitudinal movement of said spring bar forwardly or rearwardly of said trailer will be resisted but not prevented by the friction between said brakedrum and brakeshoe.

2. Means for use with a load-transferring trailer hitch as set forth in claim 1, and means for lowering said brakedrum and associated brakeshoe with respect to said trailer frame to an inoperative position closer to the unflexed position of said spring bar whereby said tension members may assume a slack condition in relation to said then unloaded spring bar.

3. Means for use with a load-transferring trailer hitch as set forth in claim 2, said means for lowering said brakedrum and associated brakeshoe comprising a back plate mounted on said frame, a support plate to which said brakedrum is affixed, ears extending laterally from said back plate beyond said support plate, links extending diagonally upwardly from pivots on said ears to pivots on said support plate located above said brakedrum thereby to suspend said support plate in a stable position against said back plate, and means for swinging said links about the said pivots on said ears to first raise said support plate slightly until it is beyond the dead center position of said links and then to continue the movement of said links to lower said support plate to the extent permitted by said links.

4. Means for use with a load-transferring trailer hitch as set forth in claim 1, said brakeshoe comprising at least two parts pivoted at their upper ends, said brake arms attached to said two parts.

5. Means for use with a load-transferring trailer hitch as set forth in claim 1, in which said brakeshoe is comprised of an upper segment and two lower segments each movably connected to the upper segment, and said brake arms are affixed to said lower segments.

6. Means for use with a load-transferring trailer hitch as set forth in claim 1 in which said tension means is in the form of a chain.